United States Patent
Nakayama

(10) Patent No.: US 11,646,901 B2
(45) Date of Patent: May 9, 2023

(54) INFORMATION PROCESSING DEVICE THAT PROCESSES WRITE REQUEST AND TRANSMISSION CONTROL METHOD

(71) Applicant: FUJITSU LIMITED, Kawasaki (JP)

(72) Inventor: Takayoshi Nakayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 337 days.

(21) Appl. No.: 17/148,372

(22) Filed: Jan. 13, 2021

(65) Prior Publication Data

US 2021/0288824 A1   Sep. 16, 2021

(30) Foreign Application Priority Data

Mar. 13, 2020   (JP) .............................. JP2020-043942

(51) Int. Cl.
| | |
|---|---|
| *H04L 29/06* | (2006.01) |
| *H04L 9/32* | (2006.01) |
| *G06Q 20/34* | (2012.01) |
| *G06Q 30/02* | (2023.01) |
| *G06Q 40/02* | (2023.01) |
| *H04L 9/06* | (2006.01) |
| *H04L 9/00* | (2022.01) |

(52) U.S. Cl.
CPC ......... *H04L 9/3297* (2013.01); *G06Q 20/341* (2013.01); *G06Q 30/02* (2013.01); *G06Q 40/02* (2013.01); *H04L 9/0643* (2013.01); *H04L 9/50* (2022.05)

(58) Field of Classification Search
CPC ....... H04L 9/3297; H04L 9/0643; H04L 9/50; H04L 9/3239; G06Q 20/341; G06Q 30/02; G06Q 40/02; G06Q 20/389; G06Q 20/405; G06Q 20/3829; G06F 9/505; G06F 16/27
See application file for complete search history.

(56) References Cited

U.S. PATENT DOCUMENTS

| | | | |
|---|---|---|---|
| 2015/0235038 | A1 | 8/2015 | Inoue et al. |
| 2020/0013025 | A1 | 1/2020 | Verma et al. |
| 2020/0074420 | A1 | 3/2020 | Yamakado et al. |
| 2021/0232200 | A1* | 7/2021 | King ........................ G06F 1/329 |
| 2021/0256010 | A1* | 8/2021 | Sinclair ............... G06F 16/2379 |

(Continued)

FOREIGN PATENT DOCUMENTS

| | | |
|---|---|---|
| EP | 3683684 A1 | 7/2020 |
| JP | 2001-290663 | 10/2001 |

(Continued)

OTHER PUBLICATIONS

EESR—Extended European Search Report of European Patent Application No. 20215457.1 dated Jun. 9, 2021.

*Primary Examiner* — Mahfuzur Rahman
(74) *Attorney, Agent, or Firm* — Fujitsu Patent Center

(57) ABSTRACT

A transmission control method includes: generating a write request for writing, to a blockchain, a transaction corresponding to a deal to be recorded in the blockchain; acquiring, from a node that performs a process for writing the transaction to the blockchain, load information that indicates an amount of load pertaining to the process to be performed by the node to write the transaction to the blockchain; and transmitting the write request to the node when a period during which the amount of the load indicated by the load information is less than a threshold reaches a specified time.

8 Claims, 10 Drawing Sheets

(56) References Cited

U.S. PATENT DOCUMENTS

2021/0264420 A1* 8/2021 Tammana .............. G06Q 20/02
2022/0086006 A1* 3/2022 Bernat ................ G06F 16/2246

FOREIGN PATENT DOCUMENTS

| JP | 2001-290663 A | 10/2001 |
| JP | 2015-153123 A | 8/2015 |
| WO | 2019/054042 A1 | 3/2019 |

* cited by examiner

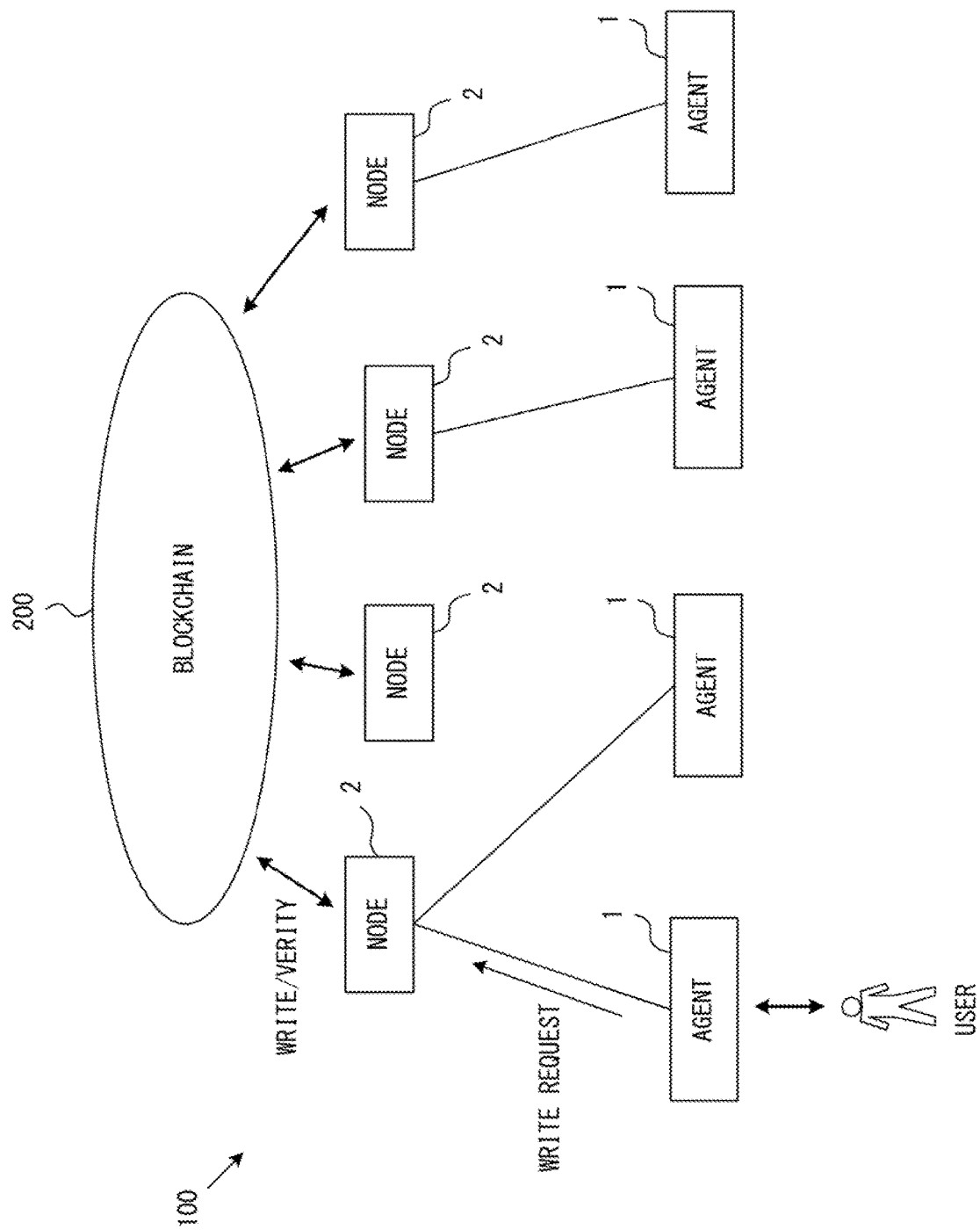
F I G. 1

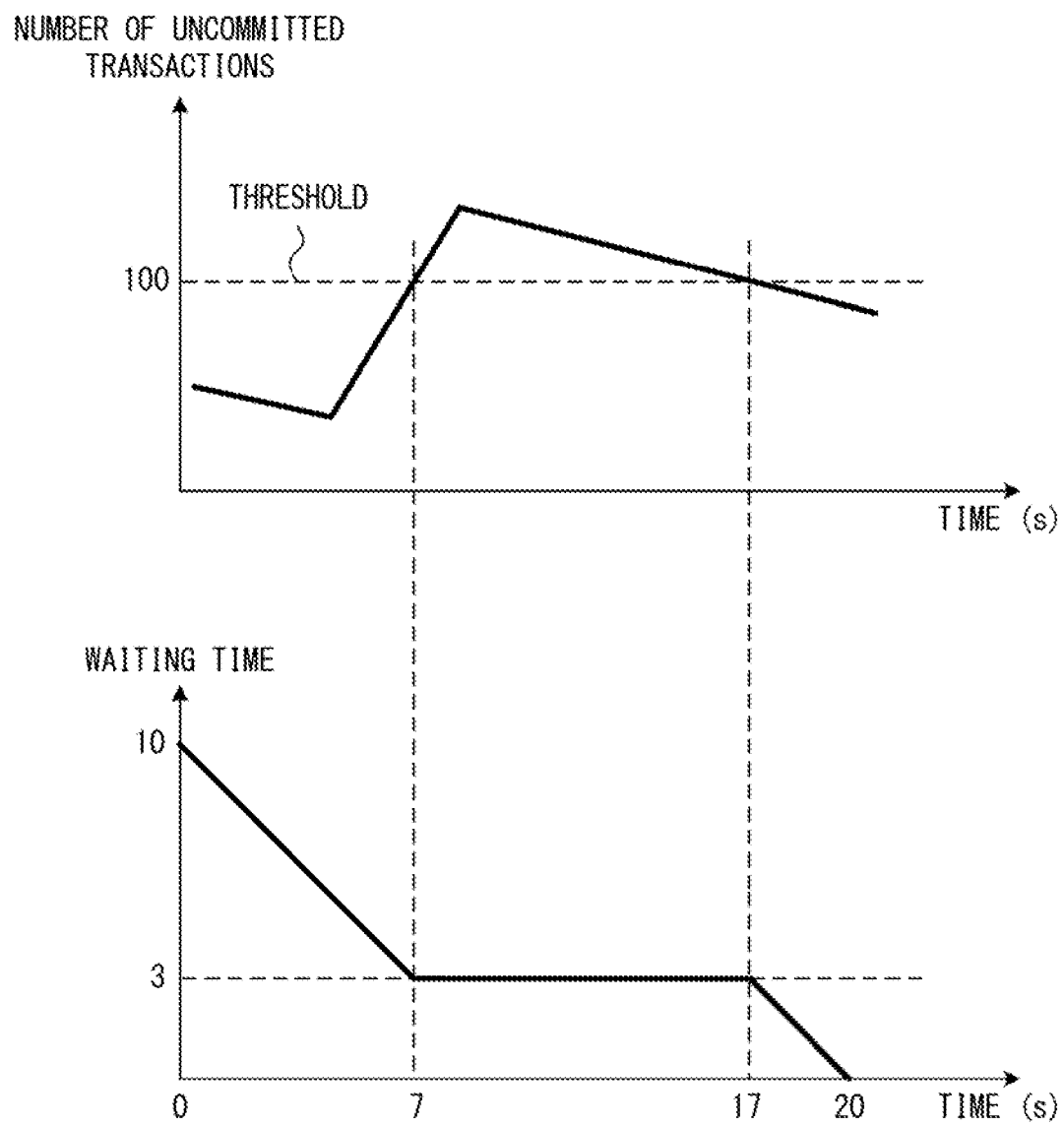
F I G. 5

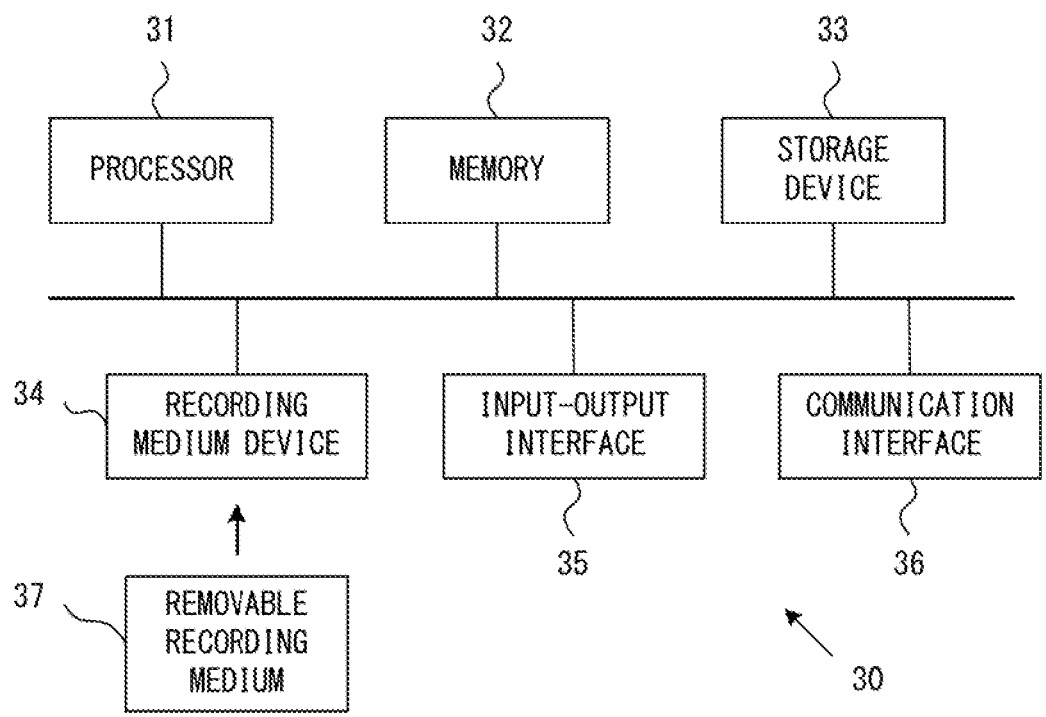
F I G. 7

INFORMATION PROCESSING DEVICE THAT PROCESSES WRITE REQUEST AND TRANSMISSION CONTROL METHOD

CROSS-REFERENCE TO RELATED APPLICATION

This application is based upon and claims the benefit of priority of the prior Japanese Patent Application No. 2020-043942, filed on Mar. 13, 2020, the entire contents of which are incorporated herein by reference.

FIELD

The embodiments discussed herein are related to an information processing device that processes a write request and a method for controlling a transmission of the write request.

BACKGROUND

In recent years, the blockchain technique has been utilized in various fields. Utilization of the blockchain technique has been studied to accurately convey personal information such as background and carriers between users and service providers in digital services, e.g., sharing services or matching services. In this case, identifiers of users or service providers, public keys, network address information of communication devices, and the like are written to a blockchain. Deal history in the digital service may be written to the blockchain. An evaluation of each user or service provider that is made in association with a deal may be written to the blockchain. In this regard, it is difficult to falsify data written to the blockchain. Thus, blockchains have been widespread as one technique for providing reliable digital services.

Relevant techniques are disclosed in Japanese Laid-open Patent Publication No. 2001-290663, International Publication Pamphlet No. WO 2019/054042, and Japanese Laid-open Patent Publication No. 2015-153123.

Transactions indicating deals that have occurred in a network are stored in a "block" in a blockchain. Each of the blocks includes one or more transactions and a hash value indicating the contents of an immediately previous block. A "chain" is formed by sequentially linking generated blocks.

When a write request for writing one or more transactions to a blockchain is made, processes such as a process for verifying information to be written and a process for making it difficult to make a falsification are performed between a plurality of nodes for performing the writing process. Then, blocks for which these processes have been finished are added to the blockchain. However, these processes typically involve a long processing time. Hence, when many write requests are made within a short period of time, the writing of transactions to a blockchain could be delayed due to congestion. This could reduce service qualities or user convenience.

SUMMARY

According to an aspect of the embodiments, a transmission control method includes: generating a write request for writing, to a blockchain, a transaction corresponding to a deal to be recorded in the blockchain; acquiring, from a node that performs a process for writing the transaction to the blockchain, load information that indicates an amount of load pertaining to the process to be performed by the node to write the transaction to the blockchain; and transmitting the write request to the node when a period during which the amount of the load indicated by the load information is less than a threshold reaches a specified time.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a communication system in accordance with embodiments of the invention;

FIG. 5 illustrates an example of transmission control performed by an agent;

FIG. 7 illustrates an example of the hardware configuration of an agent;

DESCRIPTION OF EMBODIMENTS

Figure 2:
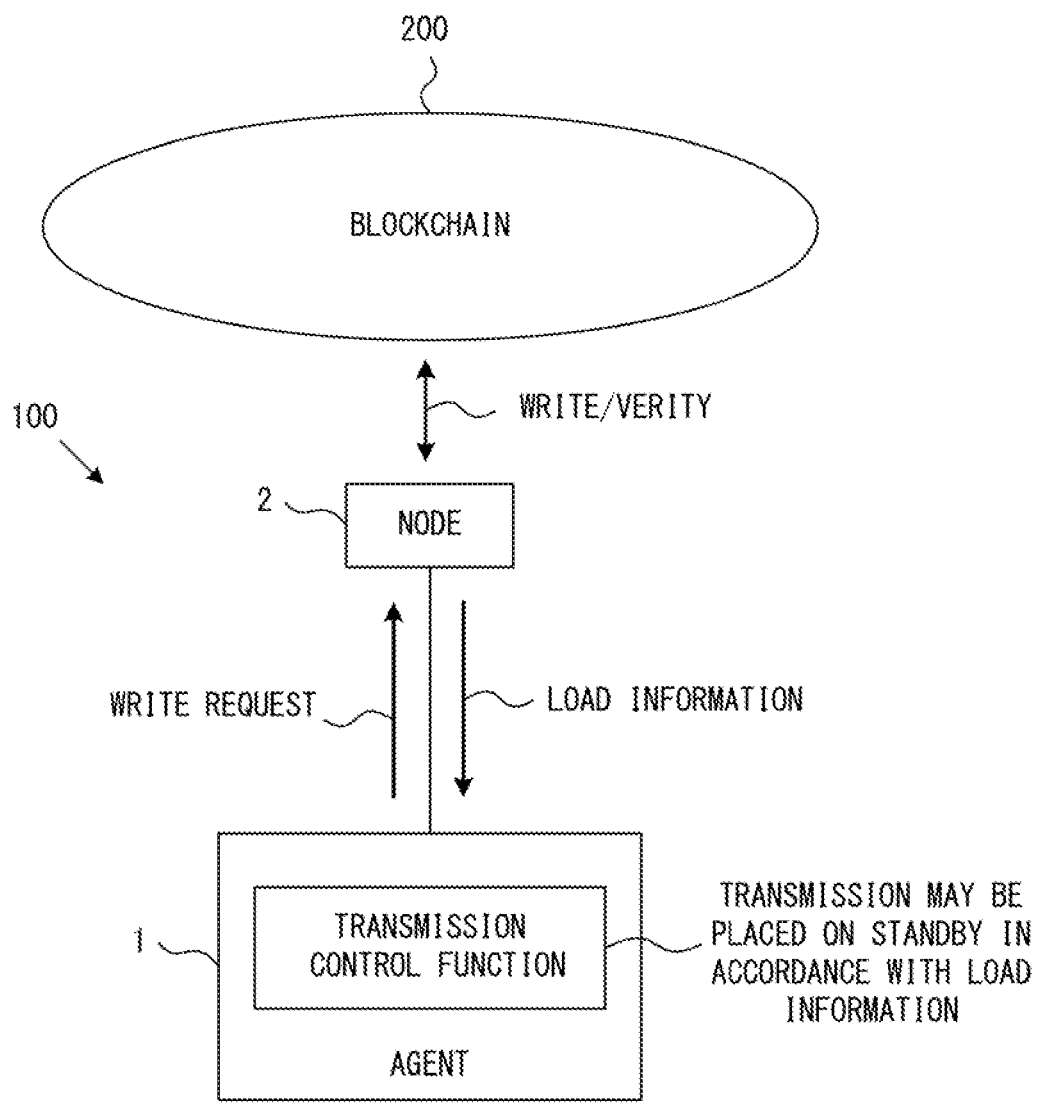
FIG. 2 illustrates an overview of transmission control performed by an agent.

FIG. 1 illustrates an example of a communication system in accordance with embodiments of the invention. As depicted in FIG. 1, a communication system 100 in accordance with embodiments of the invention includes an agent 1 and a node 2. The communication system 100 may include a plurality of agents 1 and a plurality of nodes 2. The communication system 100 can access a blockchain 200.

When a deal to be recorded in the blockchain 200 is performed, an agent 1 generates a write request for writing one or more transactions corresponding to the deal to the blockchain 200. For example, the deal may be performed between a service provider (or a server computer for the service provider) and a user (or a user terminal). For example, when the user uses a remittance service, the agent 1 may be supplied with deal information indicating a remitter, a remittee, an amount, the time of remittance, and the like. Then, the agent 1 generates a write request for recording one or more transactions corresponding to the deal information in the blockchain 200. The agent 1 transmits the generated write request to the node 2.

The agent 1 may generate a write request immediately after a deal to be recorded in the blockchain 200 is performed or may generate the write request at a later time. The agent 1 may transmit a write request to the node 2 immediately after a deal to be recorded in the blockchain 200 is performed or may transmit the write request to the node 2 at a later time.

Upon receipt of a write request from the agent 1, the node 2 performs a process for writing one or more transactions indicated by the write request to the blockchain 200. The process for writing a transaction to the blockchain 200 includes, for example, a process for verifying whether the transaction is valid, a process for causing the transaction to propagate to another node, and a process in which the node writes the transaction to the blockchain 200.

For example, each agent 1 may be implemented by an application program executed on one terminal device. Each agent 1 can be connected to one or more nodes 2 over a network. For example, each node 2 may be implemented by an application program executed on one server device. Each node 2 can be connected to one or more other nodes 2 over a network.

However, a plurality of nodes 2 may be implemented in one server device. In this case, the plurality of nodes 2 are connected to each other via an internal interface. Meanwhile, a plurality of server devices in each of which a plurality of nodes 2 are implemented may be provided in the communication system 100.

Each agent 1 may be implemented by an application program executed on a server device. In this case, a user uses the agent 1 over a network. Meanwhile, a plurality of server devices in each of which a plurality of agents 1 are implemented may be provided in the communication system 100.

A plurality of agents 1 may be implemented in one server device. In this case, for example, each user may use a corresponding agent 1 after being authenticated by an authentication function provided by the server device or an external authentication function.

In the communication system 100, when many write requests are transmitted from one or more agents 1 to a node 2 within a short period of time, the write requests are congested in the node 2. For example, congestion could occur if one agent transmits many write requests. In a case where a plurality of agents transmit write requests, congestion could occur even when the number of write requests transmitted by each agent is not large. In any case, when write requests are congested, the writing of transactions to the blockchain 200 could be delayed, thereby reducing service qualities or user convenience. Accordingly, the communication system 100 has a function for alleviating congestion of write requests.

FIG. 2 illustrates an overview of transmission control performed by an agent 1. In this example, a node 2 can receive write requests from a plurality of agents. The node 2 sequentially processes the received write requests. Thus, the node 2 writes one or more transactions to the blockchain 200 in accordance with the received write requests. The process for writing the transactions to the blockchain 200 is implementing by adding a block including the transactions to the blockchain 200. However, the process for adding the block to the blockchain 200 may be performed by another node. In this case, the node that has received the write requests can decide whether the transactions corresponding to the write requests have been written by the other node to the blockchain 200.

An agent 1 acquires load information from a node 2. The load information indicates the amount of load pertaining to a process to be performed by the node 2 to write transactions to the blockchain 200. In particular, the load information indicates the number of transactions for which the node 2 has not yet complemented the process for writing to the blockchain. The load information may be transmitted from the node 2 to the agent 1 in response to a request from the agent 1. Alternatively, the node 2 may transmit the load information to the agent 1 without a request from the agent 1. Load information is preferably transmitted from the node 2 to the agent 1 at specified time intervals. In this case, the agent 1 can monitor the amount of load on the node 2 substantially in real time.

When a deal to be recorded in the blockchain 200 is performed, an agent 1 generates a write request for writing a transaction corresponding to the deal to the blockchain 200. However, a transmission control function of the agent 1 does not transmit the write request to a node 2 until a specified condition is satisfied. In other words, the transmission control function transmits the write request to the node 2 when the specified condition is satisfied.

As an example, when a write request is generated, the transmission control function may activate a counter (or timer) for counting for a specified waiting time. In this case, when the communication system 100 includes a plurality of agents, the same waiting time may be set for the agents, or a randomly generated waiting time may be set for each of the agents. The transmission control function also controls operations of the counter in accordance with load information acquired from a node 2. In particular, the transmission control function decrements the count value of the counter when the amount of load on the node 2 is less than a specified threshold, and stops the counter when the amount of load on the node 2 is greater than or equal to the threshold. When the count value reaches zero, the transmission control function transmits the write request to the node 2.

As described above, when the amount of load on the node 2 is greater than or equal to the threshold, the counter stops, and thus the write request is not transmitted from the agent 1 to the node 2. Hence, congestion of write requests in the node 2 is alleviated.

Figure 3:
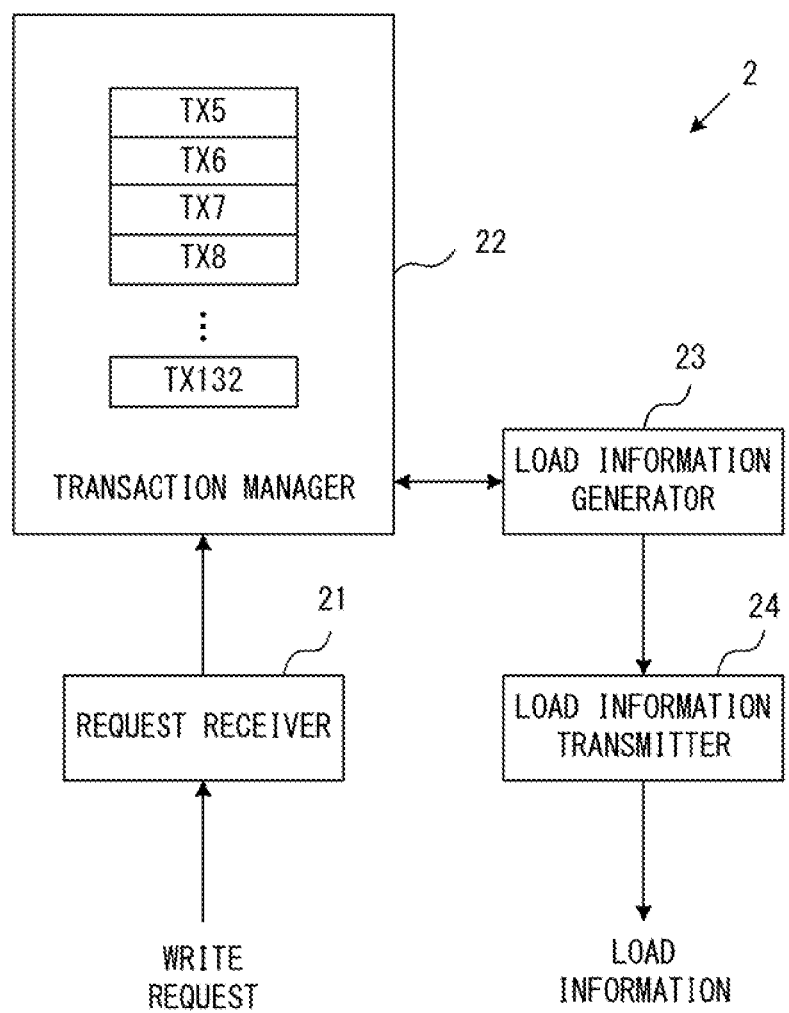
FIG. 3 illustrates an example of the functions of a node.

FIG. 3 illustrates an example of the functions of a node 2. In this example, the node 2 includes a request receiver 21, a transaction manager 22, a load information generator 23, and a load information transmitter 24. Note that the node 2 may have other functions that are not depicted in FIG. 3.

The request receiver 21 includes a communication interface and receives a write request transmitted from an agent 1. The write request includes one or more transactions. The request receiver 21 can receive a write request from an agent determined in advance or from any agent.

The transaction manager 22 performs a process for writing transactions to the blockchain 200 in accordance with a received write request. The transaction manager 22 also manages the states of transactions. In this case, for each of the transactions, the transaction manager 22 performs management as to whether the process for writing to the blockchain 200 has been completed. In the example depicted in FIG. 3, transactions TX5-TX132 have not yet been written to the blockchain 200.

The load information generator 23 generates load information in cooperation with the transaction manager 22. The load information indicates the amount of load pertaining to a process to be performed by the node 2 to write transactions to the blockchain 200. In this example, the load information indicates the number of transactions for which the node 2 has not yet complemented the process for writing to the blockchain. In the example depicted in FIG. 3, 128 transactions (TX5-TX132) have not yet been written to the blockchain 200 by the node 2. The load information generator 23 preferably generates or updates load information at specified time intervals. Note that transactions for which a node 2 has not yet completed the process for writing to the blockchain may hereinafter be referred to as "uncommitted transactions".

The load information transmitter 24 transmits load information generated by the load information generator 23 to an agent 1. For example, the load information transmitter 24 may transmit the load information to the agent 1 in response to a request from the agent 1. In the case of a configuration in which the load information generator 23 generates or updates load information at specified time intervals, the load information transmitter 24 will preferably transmit the latest load information to an agent 1 at specified time intervals in response to a request from the agent 1.

Figure 4:
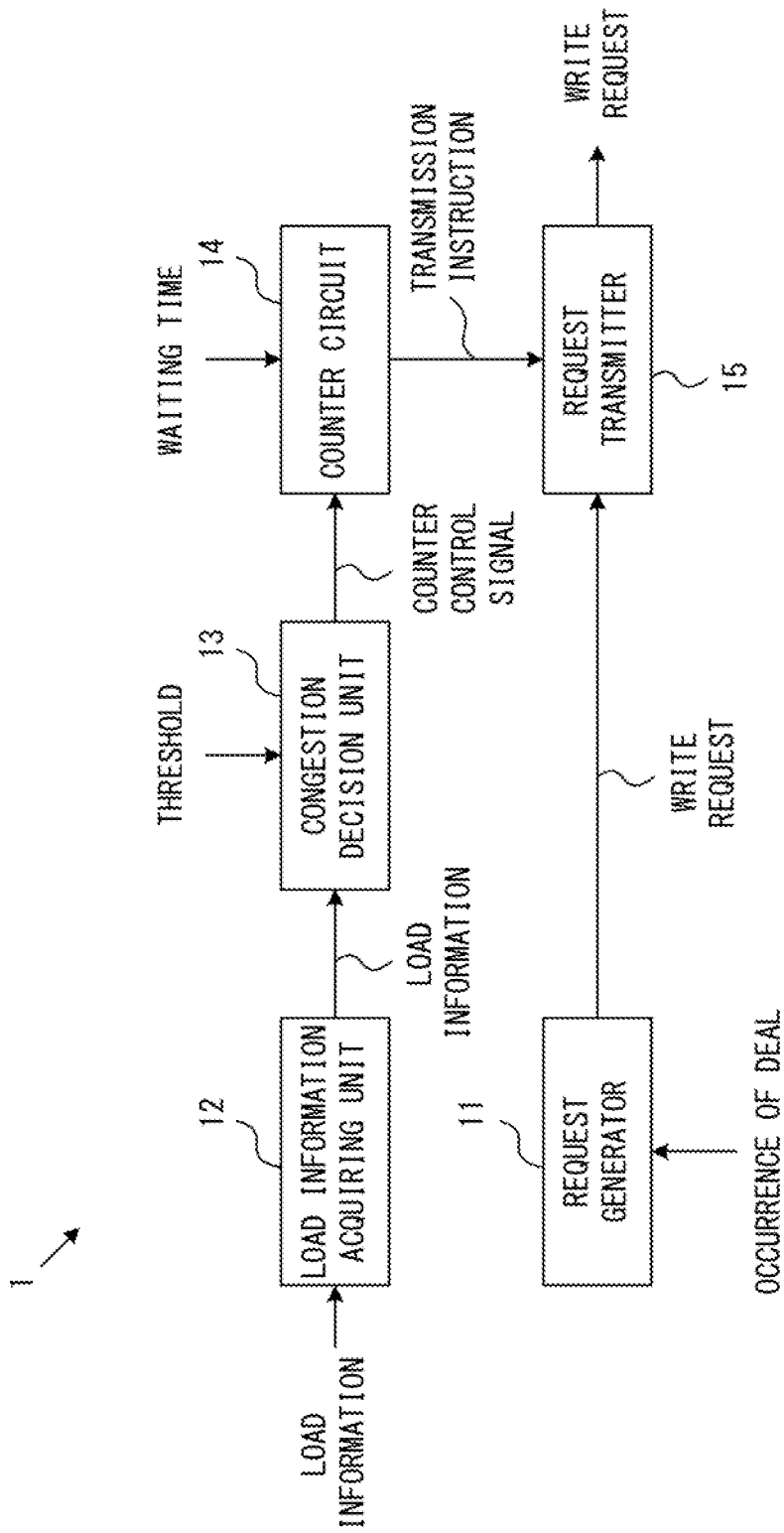
FIG. 4 illustrates an example of the functions of an agent.

FIG. 4 illustrates an example of the functions of an agent 1. In this example, the agent 1 includes a request generator 11, a load information acquiring unit 12, a congestion decision unit 13, a counter circuit 14, and a request transmitter 15. Note that the agent 1 may have other functions that are not depicted in FIG. 4.

When a deal to be recorded in the blockchain 200 is performed by a user or a service provider, the request generator 11 generates a write request for writing one or more transactions corresponding to the deal to the blockchain 200. When the request generator 11 has generated a write request, the agent 1 may make a request for a node 2 to transmit load information to the agent 1.

The load information acquiring unit 12 receives load information transmitted from a node 2. In this example, the load information indicates, as described above, the number of transactions for which the node 2 has not yet complemented the process for writing to the blockchain (i.e., the number of uncommitted transactions). The load information is preferably transmitted at specified time intervals. In this case, the agent 1 can monitor the state of transactions in the node 2 substantially in real time.

The congestion decision unit 13 compares the number of uncommitted transactions indicated by load information with a threshold. In this example, the threshold is a fixed value determined in advance. When the number of uncommitted transactions is smaller than the threshold, the congestion decision unit 13 decides that congestion of write requests has not occurred in the node 2. When the number of uncommitted transactions is larger than or equal to the threshold, the congestion decision unit 13 decides that congestion of write requests has occurred in the node 2. Then, the congestion decision unit 13 generates a counter control signal indicating the decision result.

The counter circuit 14 counts for a specified waiting time. In this example, the counter circuit 14 starts the counting operation when the request generator 11 generates a new write request. In the counting operation, a count value indicating the waiting time is decremented with time. However, the counting operation by the counter circuit 14 is controlled in accordance with a counter control signal generated by the congestion decision unit 13 (i.e., the decision result provided by the congestion decision unit 13). In particular, when the number of uncommitted transactions in the node 2 is larger than or equal to the threshold, the counter control signal instructs the counter circuit 14 to stop the counting operation. Thus, when the number of uncommitted transactions in the node 2 is larger than or equal to the threshold, the counter circuit 14 stops the counting operation. That is, when congestion of write requests has occurred in the node 2, the counting operation by the counter circuit 14 stops.

When the number of uncommitted transactions is smaller than the threshold, the counter circuit 14 continues to perform the counting operation. That is, when congestion of write requests has not occurred in the node 2, the counter circuit 14 performs the counting operation. In this way, the counter circuit 14 counts a period during which the number of uncommitted transactions is smaller than the threshold. When the period during which the number of uncommitted transactions is smaller than the threshold has reached the specified waiting time, the counter circuit 14 generates and gives a transmission instruction to the request transmitter 15.

The request transmitter 15 holds a write request generated by the request generator 11. Upon receipt of a transmission instruction from the counter circuit 14, the request transmitter 15 transmits the write request to the node 2. In this way, when the agent 1 has generated a new write request, the agent 1 will transmit the write request to the node 2 after the period during which the number of uncommitted transactions is smaller than the threshold (i.e., the period during which congestion of write requests has not occurred in the node 2) has reached the specified waiting time. Hence, congestion of write requests in the node 2 is alleviated.

FIG. 5 illustrates an example of transmission control performed by an agent 1. In this example, 100 is set as a threshold for the congestion decision unit 13 in the agent 1. Meanwhile, 10 seconds are set as the waiting time for the counter circuit 14 in the agent 1. A new write request is generated at time "zero".

In response to generation of the new write request, the agent 1 makes a request for a node 2 to transmit load information to the agent 1. Then, the node 2 transmits load information indicating the number of uncommitted transactions to the agent 1. In this example, the node 2 transmits the latest load information indicating the number of uncommitted transactions to the agent 1 at specified time intervals.

The initial value of the waiting time for the counter circuit 14 is 10 seconds. Assume that when the new write request is generated, the number of uncommitted transactions is smaller than the threshold, as depicted in FIG. 5. In this case, the congestion decision unit 13 decides that congestion of write requests has not occurred in the node 2, and the counter circuit 14 performs the counting operation. Thus, the count value indicating the waiting time decreases with time. In particular, the waiting time decreases from "10" to "3" in the period from time "zero" to time "7".

The number of uncommitted transactions changes with time. In particular, when the node 2 receives a write request, the number of uncommitted transactions is incremented, and when the writing of a transaction to the blockchain 200 is completed, the number of uncommitted transactions is decremented. In this example, the number of uncommitted transactions exceeds the threshold at time "7".

The agent 1 detects that the number of uncommitted transactions has exceeded the threshold according to load information received from the node 2. Then, the congestion decision unit 13 decides that congestion of write requests has occurred in the node 2, and the counter circuit 14 stops the counting operation. Thus, the waiting time is maintained at "3" after time "7".

Afterward, the congestion of write requests in the node 2 is gradually eased. The number of uncommitted transactions falls below the threshold at time "17". In this case, the agent 1 detects that the number of uncommitted transactions has fallen below the threshold according to load information received from the node 2. Then, the congestion decision unit 13 decides that congestion of write requests has not occurred in the node 2, and the counter circuit 14 resumes the counting operation. Thus, the waiting time decreases after time "17".

Upon the waiting time reaching "zero" at time "20", the counter circuit 14 generates a transmission instruction. Then, the request transmitter 15 transmits a new write request generated by the request generator 11 to the node 2 in accordance with the transmission instruction.

As described above, the waiting time decreases when the number of uncommitted transactions is smaller than the threshold. In the example depicted in FIG. 5, the waiting time decreases during the period of "0 to 7" and the period of "17 to 20". In this example, the sum of the periods during which the waiting time decreases is "10", which is equal to the initial value of the waiting time set for the counter circuit 14. Accordingly, the agent 1 generates a transmission instruction and transmits a write request to the node 2 when the period during which the number of uncommitted transactions is smaller than the threshold has reached a specified waiting time.

Load information transmitted from the node 2 may be received by other agents. Hence, when congestion of write requests has occurred in the node 2, it is considered that the waiting times for other agents that receive the load information are also not decreased. Thus, when the number of uncommitted transactions is larger than the threshold, other agents also do not transmit a new write request. Accordingly, during this period, the node 2 sequentially writes transactions to the blockchain 200, and the number of uncommitted transaction gradually decreases.

In a case where the communication system 100 includes a plurality of agents, the same waiting time or different waiting times may be set for the counter circuits 14 of the agents. As an example, a randomly generated waiting time may be preferably set for each of the agents. Reasons for this are described in the following.

For example, many agents 1 may generate write requests almost concurrently in a service in which many users start deals almost concurrently. In this case, when the same waiting time has been set for the agents, many agents could finish counting almost concurrently and transmit write requests almost concurrently. Thus, congestion of write requests could occur in the node 2 after all. In this regard, such congestion can be alleviated by setting a randomly generated waiting time for each of the agents.

When an initial value of the waiting time for the counter circuit 14 is long, write requests are less likely to be congested in the node 2. However, when an initial value of the waiting time long, a write request generated in the agent 1 will be held for a long time without being transmitted. Accordingly, the initial value for the waiting time is preferably determined in consideration of such trade-off.

Figure 6:
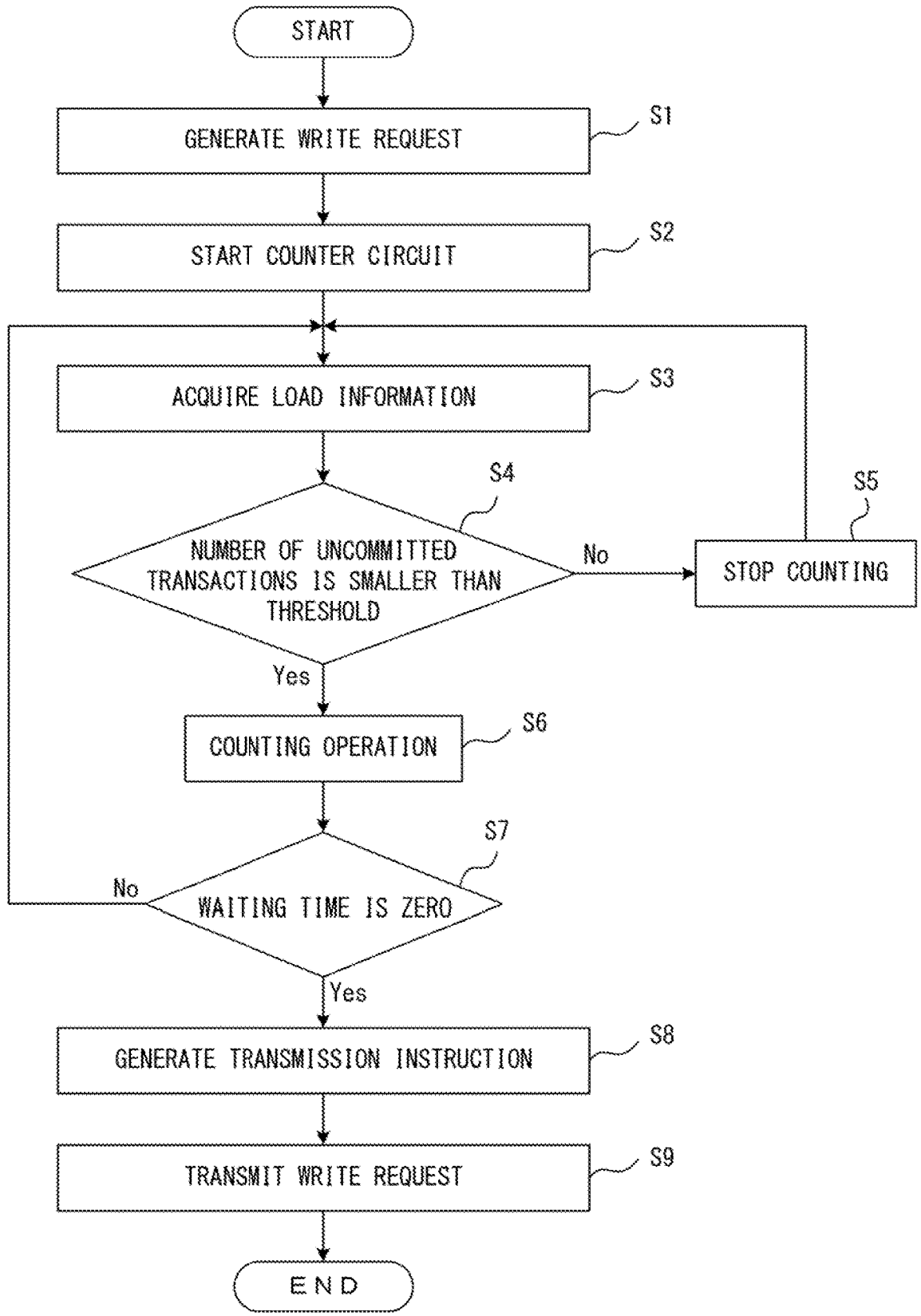
FIG. 6 is a flowchart illustrating an example of a process performed by an agent.

FIG. 6 is a flowchart illustrating an example of a process performed by an agent 1. In this example, a threshold has been set for the congestion decision unit 13, and an initial value for a waiting time has been set for counter circuit 14. A user corresponding to the agent 1 performs a deal to be recorded in the blockchain 200.

In S1, the request generator 11 generates a write request corresponding to the deal performed by the user. In S2, the agent 1 activates the counter circuit 14. In S3, the load information acquiring unit 12 acquires load information from a node 2. As an example, when the request generator 11 has generates a new write request, the load information acquiring unit 12 may request load information from the node 2.

In S4, the congestion decision unit 13 compares the number of uncommitted transactions indicated by the load information with the threshold. When the number of uncommitted transactions is larger than or equal to the threshold, the congestion decision unit 13 generates a counter control signal that instructs the counter circuit 14 to stop the counting operation. Thus, the counter circuit 14 stops the counting operation in S5. When the number of uncommitted transactions is smaller than the threshold, the counter circuit 14 performs the counting operation in S6. In this case, the waiting time decreases. Thus, the count value indicating the waiting time is decremented. After this, the counter circuit 14 decides in S7 whether the waiting time is zero. When the waiting time is greater than zero, the process of the agent 1 returns to S3.

The processes of S3-S7 are performed repeatedly at specified time intervals until the waiting time reaches zero. The specified time intervals are not particularly limited and may be, for example, intervals of 0.1 seconds. In this case, the waiting time is decremented by 0.1 seconds every time S6 is performed.

Upon the waiting time reaching zero, the counter circuit 14 generates a transmission instruction in S8. After this, in S9, the request transmitter 15 transmits the write request generated in S1 to the node 2 in accordance with the transmission instruction.

FIG. 7 illustrates an example of the hardware configuration of an agent 1. The agent 1 is implemented by an information processing device 30 depicted in FIG. 7. The information processing device 30 includes a processor 31, a memory 32, a storage device 33, a recording medium device 34, an input-output interface 35, and a communication interface 36. The information processing device 30 may also include other devices that are not depicted in FIG. 7.

The processor 31 provides the processes of the flowchart depicted in FIG. 6 by executing a communication program stored in the storage device 33. Thus, the functions of the request generator 11, the load information acquiring unit 12, the congestion decision unit 13, and the counter circuit 14 are implemented by the processor 31 executing the communication program. The memory 32 is used as a work area for the processor 31. The storage device 33 stores the communication program. The storage device 33 can also store other programs and data/information to be used by the agent. The storage device 33 may be provided outside the information processing device 30.

The recording medium device 34 can read a program, data, or information recorded in a removable recording medium 37. The above communication program may be recorded in the removable recording medium 37. In this case, the processor 31 can execute the communication program recorded in the removable recording medium 37. The input-output interface 35 provides an interface with a user. The communication interface 36 provides an interface with a network. The processor 31 can be connected to a program server via the communication interface 36. In this case, the processor 31 can execute a communication program stored in the program server.

Figure 8A:
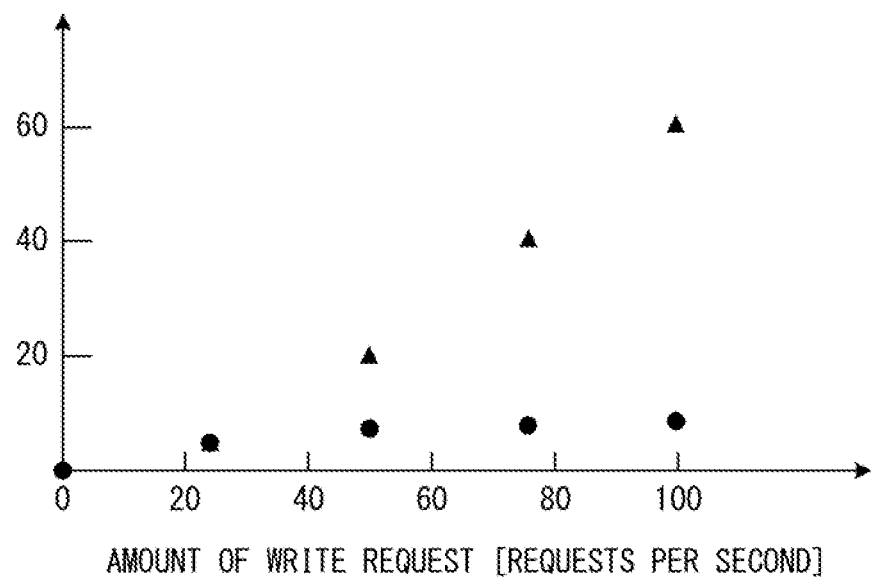
FIGS. 8A and 8B illustrate effects attained in accordance with embodiments of the invention.
Figure 8B:
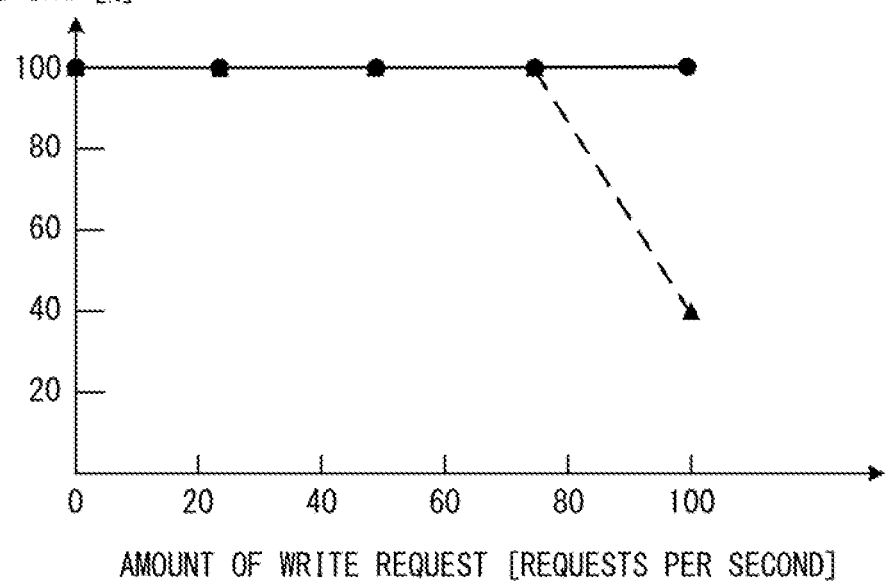

FIGS. 8A and 8B illustrate effects attained in accordance with embodiments of the invention. The horizontal axis indicates the number of write requests generated per second by an agent. Circles (or solid lines) indicate results of measurement from cases in which the agent 1 in accordance embodiments of the invention is used. Triangles (or dashed lines) indicate results of measurement from cases in which write requests generated by an agent are immediately transmitted to a node 2. In this example, the threshold set for the congestion decision unit 13 is 100. Meanwhile, the initial value of the waiting time set for the counter circuit 14 is 10 seconds.

FIG. 8A indicates average writing times per request. In this example, a writing time indicates the length of time from generation of a write request by an agent to the writing of a corresponding transaction to the blockchain 200. In a case where write requests are immediately transmitted to a node 2, the average writing time is extended when the number of generated write requests increases. For example, in a case where 100 write requests are generated per second, the average writing time is longer than one minute. By contrast, in embodiments of the present invention, the average writing time is not extended notably even when the number of generated write requests increases. For example, in a case where 100 write requests are generated per second, the average writing time is about 10 seconds. Accordingly, the average time needed to write transactions to the blockchain 200 is improved in embodiments of the present invention.

FIG. 8B indicates the rate of successful writing of transactions. In this example, the rate of successful writing indicates the probability of a transaction correspond-ng to a write request being correctly written to the blockchain 200. In a case where write requests are immediately transmitted to a node 2, the rate of successful writing sharply decreases when the number of write requests generated per second exceeds 80. By contrast, in embodiments of the invention, the rate of successful writing is about 100 percent even when 100 write requests are generated per second. Accordingly, the rate of successful writing is improved in embodiments of the present invention.

Variation

In the examples depicted in FIGS. 5-6, the counter circuit 14 is activated when the request generator 11 generates a write request. However, the present invention is not limited to this configuration. In particular, the counter circuit 14 may be activated when the number of uncommitted transactions has fallen below a threshold for the first time after the request generator 11 generated a write request.

Figure 9:
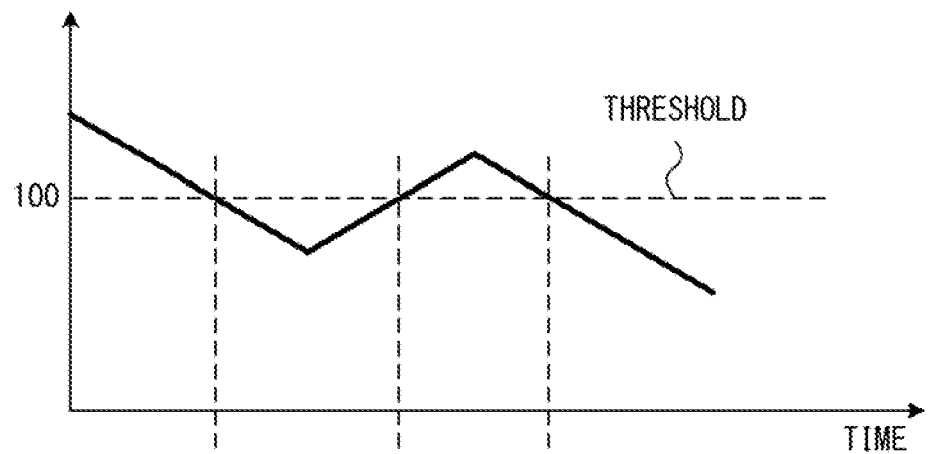
FIG. 9 illustrates a variation of transmission control performed by an agent.
Figure 9:
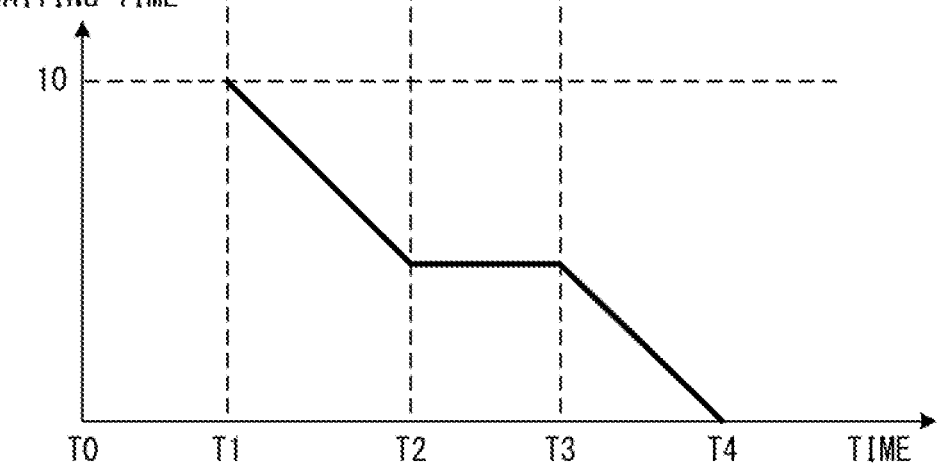

In the example depicted in FIG. 9, the number of uncommitted transactions is larger than a threshold when a write request is generated at time T0. In this case, the counter circuit 14 is not activated. When the number of uncommitted transactions falls below the threshold at time T1, the counter circuit 14 is activated. The counter value of the counter circuit 14 is decremented in the period during which the number of uncommitted transactions is smaller than the threshold (i.e., T1-T2). When the number of uncommitted transactions exceeds the threshold at time T2, the counter circuit 14 stops the counting operation. The count value of the counter circuit 14 is maintained as is in the period during which the number of uncommitted transactions is larger than the threshold (i.e., T2-T3). When the number of uncommitted transactions falls below the threshold at time T3, the counter circuit 14 resumes the counting operation. When the count value reaches zero at time T4, the counter circuit 14 generates a transmission instruction, and the request transmitter 15 transmits the write request to a node 2. Also in this case, the periods during which the number of uncommitted transactions is smaller than the threshold (i.e., T1-T2 and T3-T4) correspond to the initial value of the waiting time.

Figure 10A:
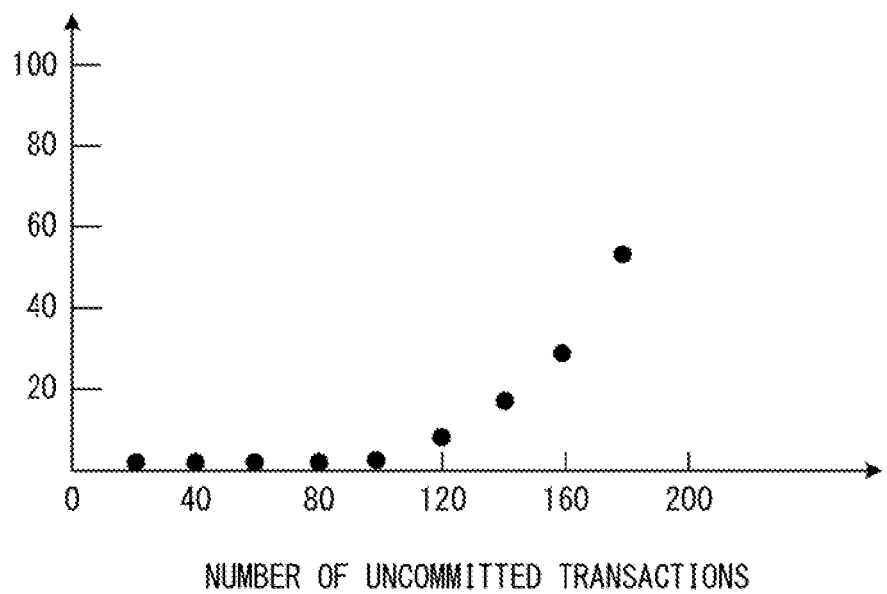
FIGS. 10A and 10B illustrate examples of a method for determining a threshold.
Figure 10B:
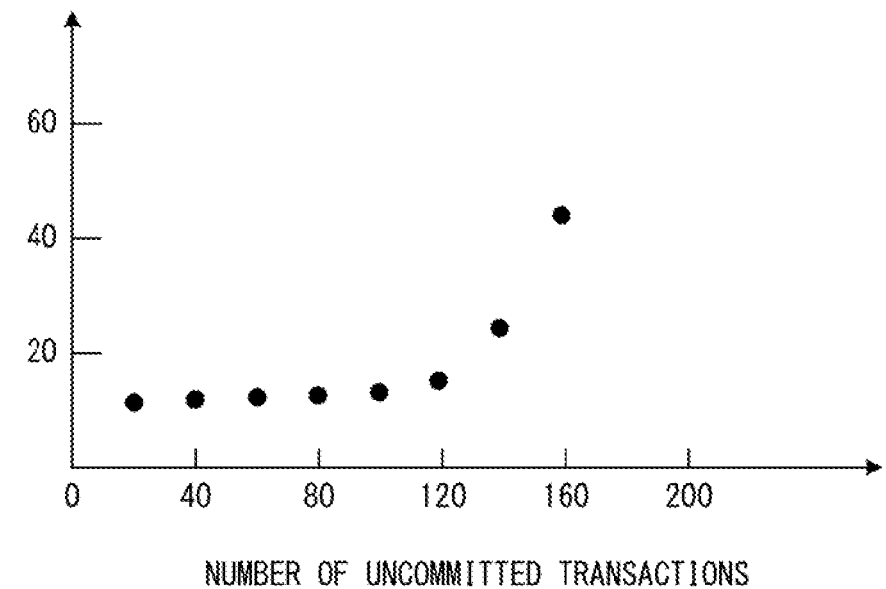

The threshold to be set for the congestion decision unit 13 may be determined according to the relationship between the number of uncommitted transactions in the node 2 and the capability of writing transactions to the blockchain 200. For example, FIG. 10A indicates a relationship between the number of uncommitted transactions in a node 2 and the rate of failure in writing to the blockchain 200. In this case, for example, the threshold may preferably be set to a value smaller than or equal to 120 in order to keep the rate of failure in writing at lower than or equal to 10 percent. FIG. 10B indicates a relationship between the number of uncommitted transactions in the node 2 and the time of writing to the blockchain 200. In this case, for example, the threshold may preferably be set to a value smaller than or equal to 120 in order to keep the writing time at shorter than or equal to 10 seconds.

In the examples described above, an agent 1 decides whether write requests have been congested in a node 2. However, the invention is not limited to this configuration. In particular, a node 2 may decide whether congestion has occurred. In this case, the congestion decision unit 13 depicted in FIG. 4 is implemented in the node 2, and load information indicating whether congestion has occurred is reported to the agent 1. The counter circuit 14 of the agent 1 controls the counting operation in accordance with the load information. In particular, the counter circuit 14 retains the count value in a period during which congestion occurs and decrements the count value in a period during which congestion does not occur. When the count value reaches zero, the counter circuit 14 generates a transmission instruction, and the request transmitter 15 transmits a write request.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a communication program for causing a processor to perform a process comprising:
    generating a write request for writing, to a blockchain, a transaction corresponding to a deal to be recorded in the blockchain;
    acquiring, from a node that performs a process for writing the transaction to the blockchain, load information that indicates an amount of load pertaining to the process to be performed by the node to write the transaction to the blockchain; and
    transmitting the write request to the node when a period during which the amount of the load indicated by the load information is less than a threshold reaches a specified time.

2. The non-transitory computer-readable recording medium according to claim 1, wherein
    the load information indicates a number of uncommitted transactions for which the node has not yet complemented the process for writing to the blockchain, and
    the process further includes transmitting the write request to the node when a period during which the number of uncommitted transactions indicated by the load information is less than the threshold reaches the specified time.

3. The non-transitory computer-readable recording medium according to claim 2, wherein
    the threshold is determined according to a relationship between the number of uncommitted transactions in the node and a probability of failure in the writing of transactions to the blockchain.

4. The non-transitory computer-readable recording medium according to claim 2, wherein
    the threshold is determined according to a relationship between the number of uncommitted transactions in the node and a time needed to write transactions to the blockchain.

5. The non-transitory computer-readable recording medium according to claim 2, the process further comprising:
  activating, when the write request is generated, a counter for which a specified waiting time is set;
  stopping the counter in a period during which the number of uncommitted transactions is larger than or equal to the threshold;
  decrementing the counter in a period during which the number of uncommitted transactions is smaller than the threshold; and
  transmitting the write request to the node when a count value of the counter reaches zero.

6. An information processing device comprising:
  a hardware processor configured to
    generate a write request for writing, to a blockchain, a transaction corresponding to a deal to be recorded in the blockchain;
    acquire, from a node that performs a process for writing the transaction to the blockchain, load information indicating an amount of load pertaining to the process to be performed by the node to write the transaction to the blockchain; and
    transmit the write request to the node when a period during which the amount of load indicated by the load information is less than a threshold reaches a specified time.

7. The information processing device according to claim 6, wherein
  the processor decides whether write requests have been congested in the node according to a comparison between the amount of load indicated by the load information and the threshold,
  the processor sets a specified waiting time in a counter, decrements the counter when the processor decides that write requests have been congested in the node, and generates a transmission instruction when a count value of the counter reaches zero, and
  the processor transmits the generated write request to the node when the counter circuit generates the transmission instruction.

8. A transmission control method comprising:
  generating a write request for writing, to a blockchain, a transaction corresponding to a deal to be recorded in the blockchain;
  acquiring, from a node that performs a process for writing the transaction to the blockchain, load information that indicates an amount of load pertaining to the process to be performed by the node to write the transaction to the blockchain; and
  transmitting the write request to the node when a period during which the amount of the load indicated by the load information is less than a threshold reaches a specified time.

\* \* \* \* \*